(12) United States Patent
Zabala et al.

(10) Patent No.: US 11,826,632 B2
(45) Date of Patent: Nov. 28, 2023

(54) METHODS FOR MANUFACTURING INDIVIDUALIZED PROTECTIVE GEAR FROM BODY SCAN AND RESULTING PRODUCTS

(71) Applicant: AUBURN UNIVERSITY, Auburn, AL (US)

(72) Inventors: Michael Edgar Zabala, Auburn, AL (US); Vitale Kyle Castellano, Auburn, AL (US); Jacob Stuart Larson, Auburn, AL (US); Austin J. Harris, Auburn, AL (US)

(73) Assignee: Auburn University, Auburn, AL (US)

( * ) Notice: Subject to any disclaimer, the term of this patent is extended or adjusted under 35 U.S.C. 154(b) by 0 days.

(21) Appl. No.: 17/179,698

(22) Filed: Feb. 19, 2021

(65) Prior Publication Data
US 2021/0252372 A1 Aug. 19, 2021

Related U.S. Application Data

(60) Provisional application No. 63/088,722, filed on Oct. 7, 2020, provisional application No. 62/978,642, filed on Feb. 19, 2020.

(51) Int. Cl.
*A63B 71/12* (2006.01)
*A41D 13/015* (2006.01)
(Continued)

(52) U.S. Cl.
CPC ...... *A63B 71/1225* (2013.01); *A41D 13/0156* (2013.01); *B29C 65/48* (2013.01);
(Continued)

(58) Field of Classification Search
CPC ..... B33Y 50/02; A42C 2/002; A63B 71/1225; B29C 63/20
(Continued)

(56) References Cited

U.S. PATENT DOCUMENTS 9,201,988 B2 12/2015 Stanhope et al.
9,232,827 B1 * 1/2016 Penn ...................... A42B 3/324
(Continued)

FOREIGN PATENT DOCUMENTS

KR 101778833 B1 * 9/2017 ............. G06T 15/04
WO 2015/120271 A1 8/2015

OTHER PUBLICATIONS

Liu, "A survey on CAD methods in 3D garment design" Computers in Industry 61 (2010) 576-593 (Year: 2010).*
Davis, "Filling Holes in Complex Surfaces using Volumetric Diffusion" Proceedings of the First International Symposium on 3D Data Processing Visualization and Transmission (3DPVT.02), Available 2002 (Year: 2002).*
(Continued)

*Primary Examiner* — Matthew J Daniels
*Assistant Examiner* — Hana C Page
(74) *Attorney, Agent, or Firm* — Bradley Arant Boult Cummings, LLP; Jacob Neu; Lucas Yardy

(57) ABSTRACT

A method for manufacturing individualized protective gear such as pads based on a body scan, and the resulting pads, are disclosed herein. A body scan is taken of a wearer-defined area for a desired set of pads. The scan is converted to a mesh model. The mesh model is used to define a first surface of the pad shell and then translationally or orthogonally offset to provide a second surface of the pad shell. The mesh is also flattened to provide a liner for the pad. The shell may be manufactured using additive printing technology. The shell and the liner are then attached, such as by adhesive.

12 Claims, 7 Drawing Sheets

(51) Int. Cl.
   *B29C 65/48* (2006.01)
   *B33Y 50/02* (2015.01)
   *B33Y 80/00* (2015.01)

(52) U.S. Cl.
   CPC ....... *A63B 2071/1258* (2013.01); *B33Y 50/02* (2014.12); *B33Y 80/00* (2014.12)

(58) Field of Classification Search
   USPC .......................................................... 703/6
   See application file for complete search history.

(56) References Cited

U.S. PATENT DOCUMENTS

| | | | |
|---|---|---|---|
| 9,469,075 | B2 | 10/2016 | Zachariasen et al. |
| 10,067,500 | B2 | 9/2018 | Hargovan et al. |
| 2009/0306801 | A1 | 12/2009 | Sivak et al. |
| 2012/0090068 | A1* | 4/2012 | Glass ................. A41D 13/0543 156/196 |
| 2015/0055086 | A1 | 2/2015 | Fonte et al. |
| 2016/0101571 | A1 | 4/2016 | Schouwenberg et al. |
| 2016/0349738 | A1* | 12/2016 | Sisk ....................... B33Y 50/00 |
| 2016/0361511 | A9 | 12/2016 | Karpas et al. |
| 2016/0374431 | A1 | 12/2016 | Tow |
| 2017/0095014 | A1 | 4/2017 | King |
| 2018/0235304 | A1* | 8/2018 | Fischer .................. A42B 3/124 |
| 2019/0133240 | A1* | 5/2019 | Knight ................... A42C 2/007 |
| 2019/0231018 | A1 | 8/2019 | Boutin |
| 2020/0034016 | A1 | 1/2020 | Boissonneault et al. |

OTHER PUBLICATIONS

McMorrow, "Additive Manufacturing of a Motorcycle Helmet Utilizing 7-Axis 3D Printing," Mechanical Engineering Senior Theses. (2018) (Year: 2018).*
3Faktur, "Accuracies and tolerances in 3D printing," Available on Nov. 16, 2019, <https://3faktur.com/en/accuracies-and-tolerances-in-3d-printing> (Year: 2019).*
Mechanicaleng Blog, "Siemens nx how to use thicken command" Available Oct. 24, 2018 <https://mechanicalengblog.com/siemens-nx-how-to-use-thicken-command/> (Year: 2018).*
Abtew (Development of comfortable and well-fitted bra pattern for customized female soft body armor through 3D design process of adaptive bust on virtual mannequin, Computers in Industry 100 (2008) 7-20) (Year: 2008).*
Mufasu CAD ("Autocad Tutorial How to Use Offset and Trim Surface Command," publicly available on Aug. 10, 2017, <https://youtu.be/bjnT0bdfXXA>). (Year: 2017).*
"What is Soft Body Armor?", available on Mar. 12, 2021, <https://primearmor.us/what-is-soft-body-armor/#:~:text=Synthetic%20fibers%2C%20nylon%2C%20fiberglass%2C,fit%20to%20the%20wearer's%20body> (Year: 2021).*
Cazón-Martín, A. et al., "Design and manufacturing of shin pads with multi-material additive manufactured features for football players: A comparison with commercial shin pads", Proc. Inst. Mech. Eng. Part P J. Sport. Eng. Technol. 2019, vol. 233, pp. 160-169.
PCT/US2021/018674, Written Opinion of the International Searching Authority.

* cited by examiner

METHODS FOR MANUFACTURING INDIVIDUALIZED PROTECTIVE GEAR FROM BODY SCAN AND RESULTING PRODUCTS

CROSS-REFERENCE TO OTHER APPLICATIONS

This application claims the benefit of filing of U.S. Provisional Patent Application No. 63/088,722 filed on Oct. 7, 2020, and further of U.S. Provisional Patent Application No. 62/978,642, filed on Feb. 19, 2020, both of which are incorporated by reference herein.

BACKGROUND OF THE ART

Additive printing permits the creation of a three-dimensional object by depositing thermoplastic material onto a base or filler such that the object is produced by cumulatively adding material in a defined process. Additive printing permits objects to be fabricated using customizable or personalizable designs. However, such personalized products are also time consuming to measure and define. This is particularly the case where personal body measurements are required, such as with personal protective equipment as is used in sports and athletics. Furthermore, to make a well-customized design, the product should also take into account differences in individuals' bodies that are not easily measured, e.g., for a shin guard, the curvature of shin or the bow of a leg should be measured. In addition, current processes for preparing personalized equipment limit which elements of the equipment users may change to the contact surface only, rather than permitting changes to size, thickness, etc.

What is needed, then is a process for obtaining personal body measurements and characteristics in a manner that obtains a full scan of the body measurement and permits readily accessibly customization of different specifications of desired equipment for rapid, unique manufacturing.

SUMMARY OF THE INVENTION

In some respects the disclosure concerns a method for fabricating equipment having a shell portion and a liner portion to be worn by a wearer, having the steps of obtaining a body scan of at least portion of the wearer's body where the equipment is to be worn; receiving input regarding the equipment, the input comprising a size and location of equipment to be worn on wearer; preparing a wearer mesh model derived from the body scan at the location of equipment to be worn on wearer; preparing a model of the shell, the shell having a first surface defined by the wearer mesh model and a second surface translationally offset from and identical to the first surface; checking the model of the shell to identify production defects and, if a production defect is present, removing the defect; preparing a model of a liner by flattening the model of the shell; additively manufacturing the shell; manufacturing the liner; and attaching the liner to the shell.

A pad having a shell and a liner manufactured by a process of preparing a wearer mesh model derived from a body scan of a wearer at a location where the pad is to be worn; preparing a model of the shell, the shell having a first surface defined by the wearer mesh model and a second surface translationally offset from and identical to the first surface; checking the model of the shell to identify production defects and, if a production defect is present, removing the defect; preparing a model of a liner by flattening the model of the shell; additively manufacturing the shell; manufacturing the liner; and attaching the liner to the shell.

A pad for wear at a location on a wearer, having a shell having a first surface with a first surface topography substantially identical to a surface topography at the location on the wearer, and a second surface having a second surface topography identical to and translationally offset from the first surface; and a liner attached to the shell, wherein the liner is a flattened surface derivative of the first surface topography.

Other aspects of the invention are described further with respect to the detailed description and the claims.

DETAILED DESCRIPTION

Introductory Information and Definitions

Figure 1A:
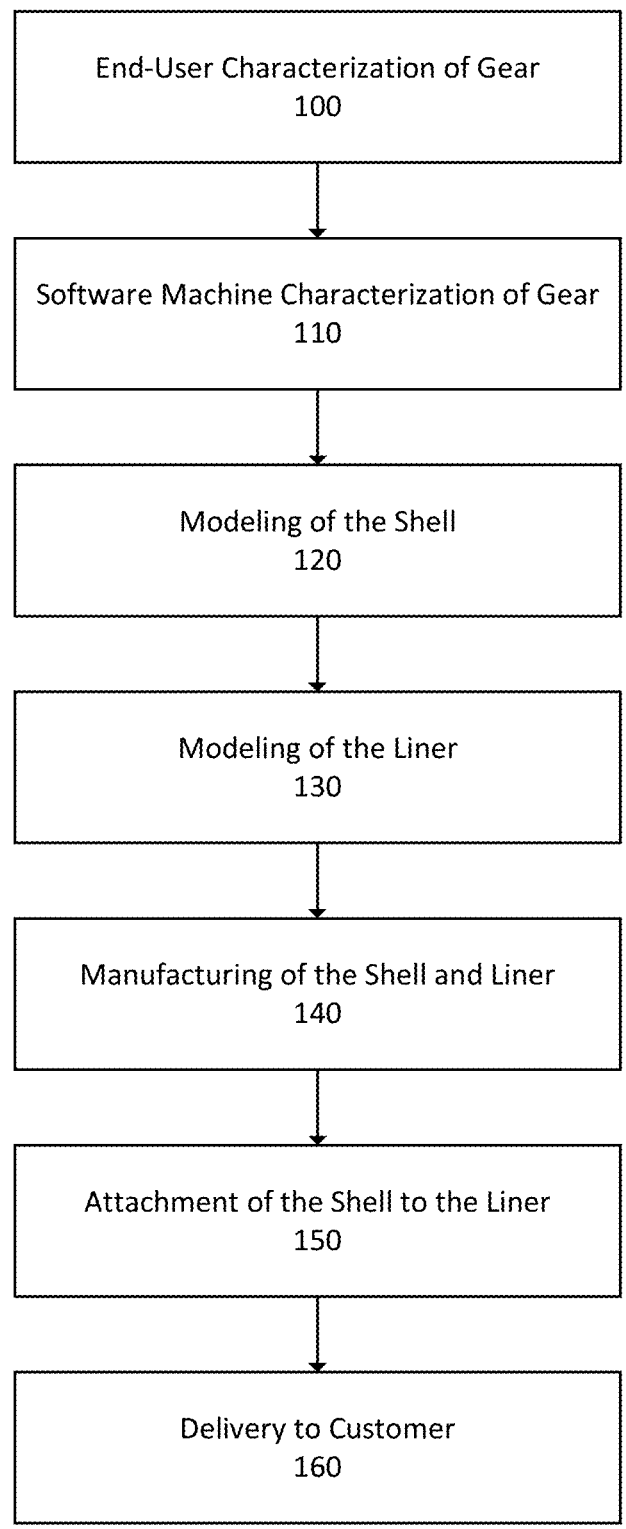
FIGS. 1A-1C are flow charts showing various steps in an exemplary method according to one embodiment of the disclosure.

Disclosed herein are systems and methods for manufacturing individualized protective equipment for a human person, such as a shin guard, knee pad, elbow pad, chest protector, helmet, shoulder pad, shoulder brace, rib protector, thigh pads, hip pads, or similar protective gear. Such devices typically include at least one substantially more rigid element fabricated from materials such as metal, carbon fiber filaments, hard plastics (e.g., polylactic acid (PLA), acrylonitrile butadiene styrene (ABS), polyethylene terephthalate glycol, or rubbery thermoplastics (e.g., thermoplastic polyurethane or thermoplastic elastomers) and at least one soft element fabricated from foamed plastics, such as ethylene-vinyl acetate (EVA) or neoprene. These materials are not intended to be exclusive, and other materials known for use in additive printing may be used in their place. "Gear" in this disclosure means the wearable pad, equipment, or device in its conceived or final form. "Shell" in this disclosure refers to the hard elements of a gear. A shell may be on an external facing side of the gear (as in a shin guard or helmet), an internal or body-facing side of the gear (as used in some elbow or knee pads), or integrated within the gear (as may be done on a baseball chest protector). "Liner" in this disclosure refers to the soft and/or foamed elements of the gear. Again, the liner may be on the external surface of the gear (as in some elbow pads or knee pads), the internal or body-facing surface of the gear (as in a shin guard or helmet), or surrounding the shell (as in a chest protector).

Protective equipment such as those listed above may be mass manufactured to standard sizes. However, such mass produced products may not have the best size, shape, or fit for any individual wearer. The systems and methods described herein address this disadvantage by allowing for rapid production of individualized protective equipment using body scans of an individual's body part or region being protected.

In describing the embodiments depicted herein, the systems and methods will be described primarily in relation to the manufacture of a shin guard, such as is used in playing soccer or football. However, the systems and methods may be used in connection with the production of any of bodily protective gear or equipment, and the steps and systems described herein may be modified by a person of skill in the art to account for the different shapes of the body part or region or the manufacture of specific types of equipment. Therefore, while the embodiments will be described herein with reference to the shin as the particular body part being protected and the production of a shin guard, it should be understood that such embodiments may be adapted for scanning and protecting any desired surface region of the body and preparing a pad or other or protective equipment therefore.

As used in this disclosure and the claims, the word "about" when used in reference to a distance means within 10% plus or minus the stated distance.

A computer may be a uniprocessor or multiprocessor machine, in the form of a desktop, laptop, remote server, tablet computer, smartphone, or other computing device. Accordingly, a computer may include one or more processors and, thus, the aforementioned computer system may also include one or more processors. Examples of processors include sequential state machines, microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), gated logic, and other suitable hardware configured to perform the various functionality described throughout this disclosure.

Additionally, the computer may include one or more memories. Accordingly, the aforementioned computer systems may include one or more memories. A memory may include a memory storage device or an addressable storage medium which may include, by way of example, random access memory (RAM), static random access memory (SRAM), dynamic random access memory (DRAM), electronically erasable programmable read-only memory (EEPROM), programmable read-only memory (PROM), erasable programmable read-only memory (EPROM), hard disks, floppy disks, laser disk players, digital video disks, compact disks, video tapes, audio tapes, magnetic recording tracks, magnetic tunnel junction (MTJ) memory, optical memory storage, quantum mechanical storage, electronic networks, and/or other devices or technologies used to store electronic content such as programs and data.

In particular, the one or more memories may store computer executable instructions that, when executed by the one or more processors, cause the one or more processors to implement the procedures and techniques described herein. The one or more processors may be operably associated with the one or more memories so that the computer executable instructions can be provided to the one or more processors for execution. For example, the one or more processors may be operably associated to the one or more memories through one or more buses. Furthermore, the computer may possess or may be operably associated with input devices (e.g., a keyboard, a keypad, controller, a mouse, a microphone, a touch screen, a sensor) and output devices such as (e.g., a computer screen, printer, or a speaker).

The computer may execute an appropriate operating system such as LINUX®, UNIX®, MICROSOFT® WINDOWS®, APPLE® MACOS®, IBM® OS/2®, ANDROID®, and PALM® OS, and/or the like. The computer may advantageously be equipped with a network communication device such as a network interface card, a modem, or other network connection device suitable for connecting to one or more networks.'

A computer may advantageously contain control logic, or program logic, or other substrate configuration representing data and instructions, which cause the computer to operate in a specific and predefined manner as, described herein. In particular, the computer programs, when executed, enable a control processor to perform and/or cause the performance of features of the present disclosure. The control logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The control logic conventionally includes the manipulation of digital bits by the processor and the maintenance of these bits within memory storage devices resident in one or more of the memory storage devices. Such memory storage devices may impose a physical organization upon the collection of stored data bits, which are generally stored by specific electrical or magnetic storage cells.

The control logic generally performs a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, files, or the like. It should be kept in mind, however, that these and some other terms should be associated with appropriate physical quantities for computer operations, and that these terms are merely conventional labels applied to physical quantities that exist within and during operation of the computer based on designed relationships between these physical quantities and the symbolic values they represent.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general-purpose computing machines or devices may be used with programs constructed in accordance with some of the teachings described herein. In some embodiments, very specific computing machines, with specific functionality, may be required. Similarly, it may prove advantageous to construct a specialized apparatus to perform the method steps described herein by way of dedicated computer systems with hard-wired logic or programs stored in nonvolatile memory, such as, by way of example, read-only memory (ROM).

In some embodiments, features of the computer systems can be implemented primarily in hardware using, for example, hardware components such as application specific integrated circuits (ASICs) or field-programmable gated arrays (FPGAs). Implementation of the hardware circuitry will be apparent to persons skilled in the relevant art(s). In yet another embodiment, features of the computer systems can be implemented using a combination of both general-purpose hardware and software.

The protective gear and equipment manufactured according to the embodiments may be fabricated using additive manufacturing technology, also known as 3D printing. Currently the most common form of additive manufacturing is fused filament fabrication or fused deposition modeling. In this method of printing a continuous filament of thermoplastic material is deposited onto a printed body by an extruder head moving over the body. The body may be supported by filler material or vertical support structures for producing overhanging elements of the body. The systems and methods will be described herein primarily with reference to fused filament fabrication, but it should be understood that the products produced by the processes and systems herein may be manufactured using other additive manufacturing technologies or non-additive manufacturing technologies.

The Methods and the Resulting Product

Figure 1B:
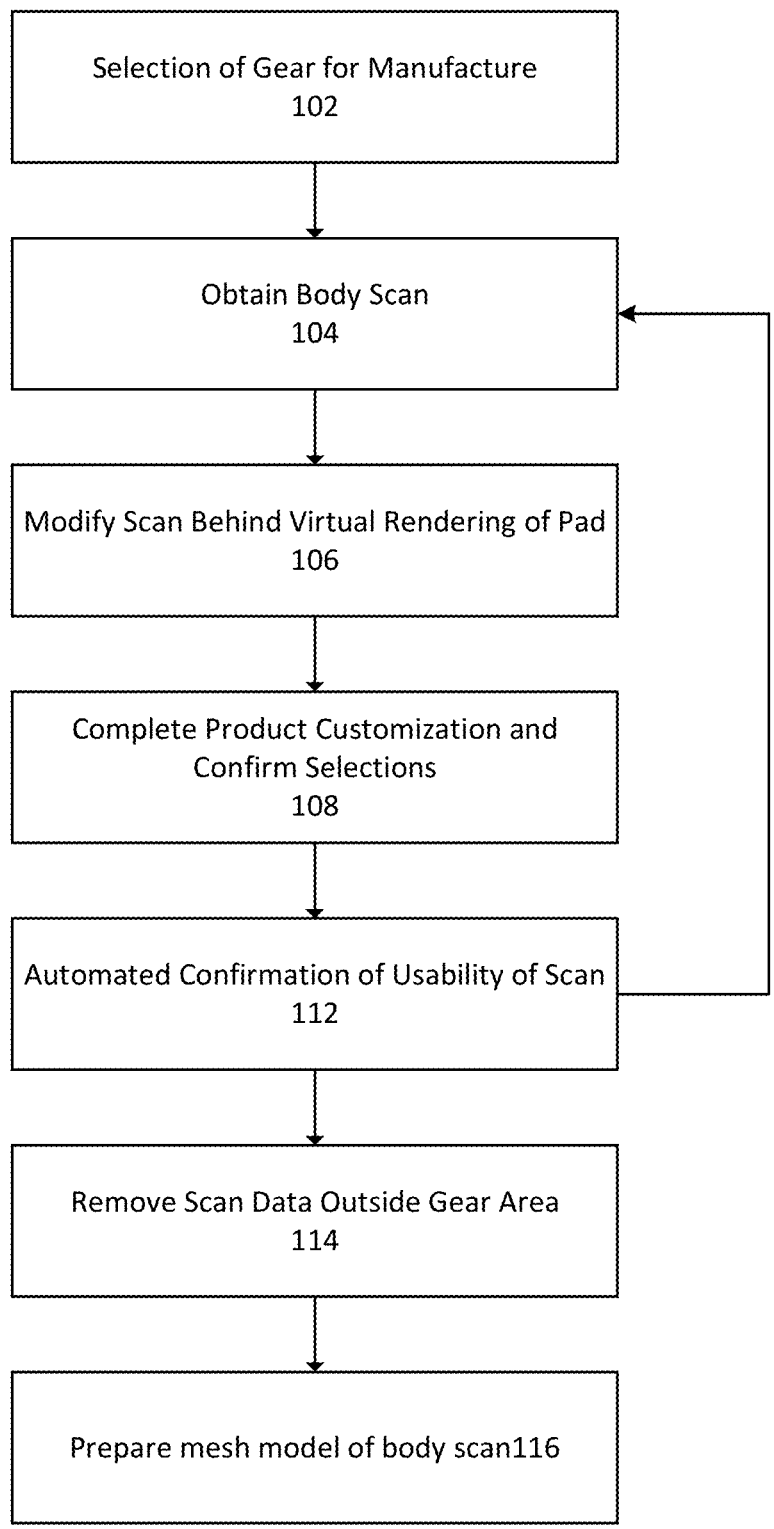
Figure 1C:
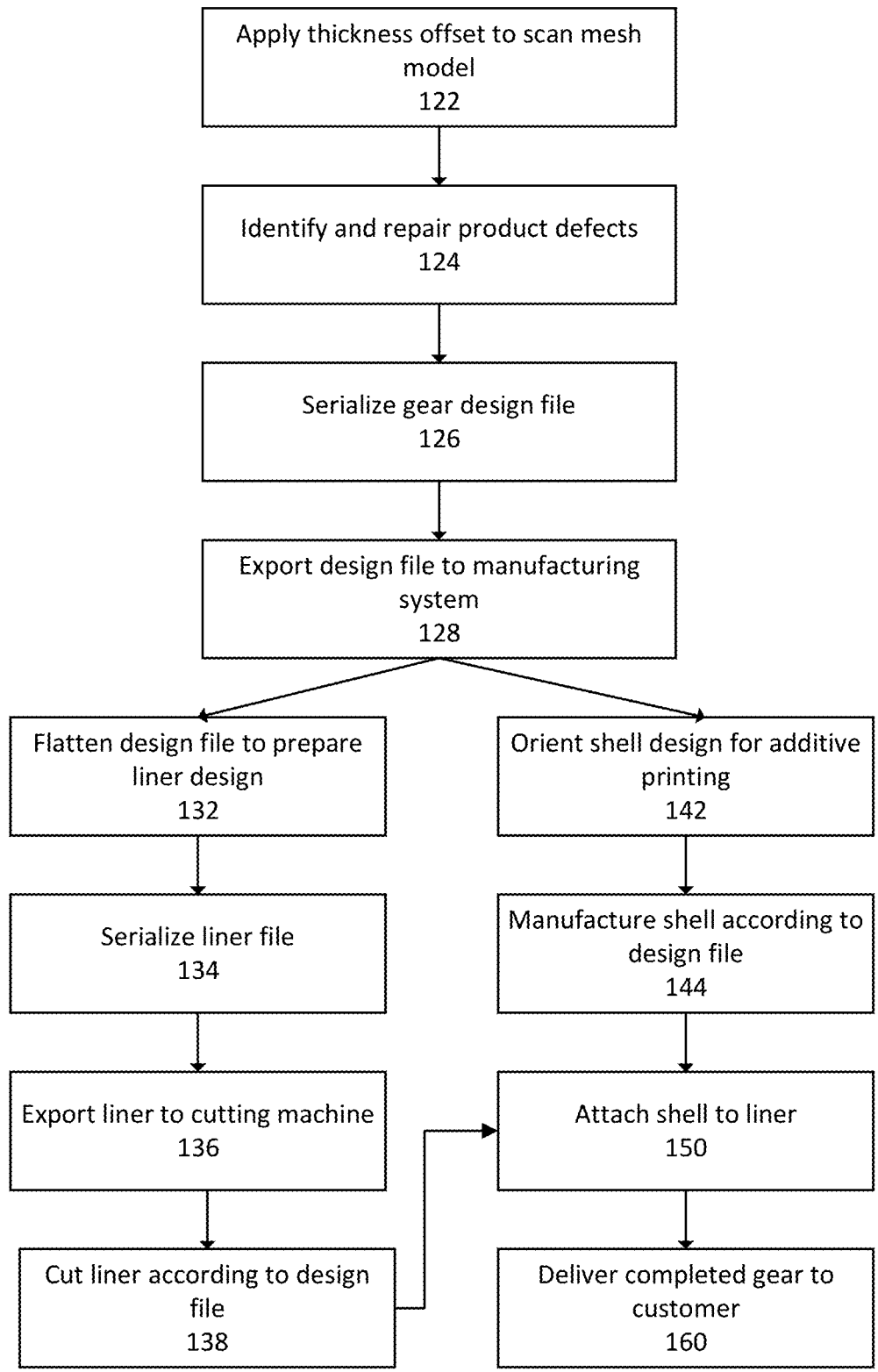

FIGS. 1A-1C depict flow charts showing general procedures for manufacturing protective equipment using a scan of the body region or part to be protected. The steps and systems referred to in FIGS. 1A-1C will be further described individually below. The method has the following major steps depicted in FIG. 1A, most of which are divided into sub-steps described further below and depicted in FIGS. 1B-1C: end-user characterization of the gear to be manufactured 100; automated or software machine characterization of the gear 110; modeling of the gear shell 120; modeling of the gear liner 130; manufacturing of the shell and liner 140; attachment of the liner to the shell 150; and delivery to the customer 160.

Figure 2:
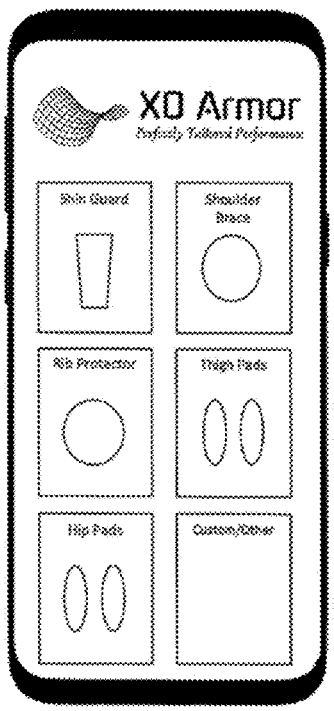
FIG. 2 depicts an exemplary user interface for selecting desired gear for manufacture, according to one embodiment of the disclosure.

In the step of end-user characterization of the gear 100, the user first selects the desired gear to be manufactured 102. This may be done using a computer, such as a desktop, laptop, tablet computer, or mobile device such as a smartphone using a software application programmed to execute the steps of walking the user through the device selection. A smartphone mobile application interface design permitting a user to select the desired gear is depicted in FIG. 2.

Figure 3:
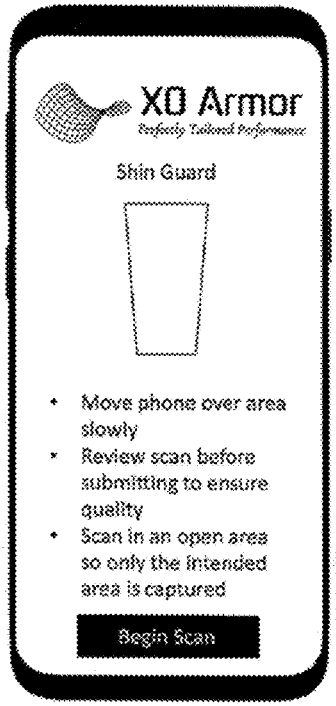
FIG. 3 depicts instructions for a user to obtain a body scan using a smartphone, according to one embodiment of the disclosure.
Figure 4A:
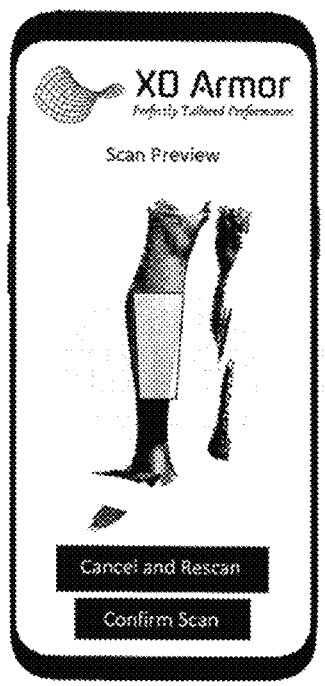
FIGS. 4A and 4B depict scan previews obtained from a smartphone camera with depth-sensing technology, according to embodiments of the disclosure.
Figure 4B:
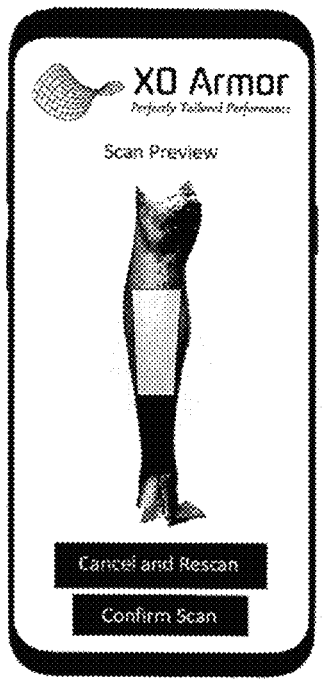

Next, the user is directed to take a body scan of the body part or region to be protected 104. A body scan may be obtained by various means known to the person of ordinary skill. For example, the body scan data may be obtained from a scanning machine using LiDAR, a structured-light 3D scanner, or other scanning technologies. For such machines or equipment, the scanning system may be programmed to obtain a scan and related metrical data automatically after being instructed to take a scan of the applicable body part or region. Alternatively, the body scan may be obtained using a smartphone or tablet device equipped with LiDAR technology or depth-sensing cameras (such as the TRUEDEPTH® dual-camera depth-sensing technology currently used on the IPHONE®). If the body scan uses a smartphone, tablet, or other LiDAR- or camera-based handheld device, the user may be instructed to take an image of the applicable location of the body. One or more scans may be required to obtain full coverage of the applicable body part or region. For example, a shin guard, which is applied to the front shin of the wearer's leg, may only need a single scan to capture the applicable part of the leg. Alternatively, multiple scans may be necessary to provide a full scan of a player's shoulders to manufacture shoulder pads. FIG. 3 depicts instructions for a user to obtain a body scan using a smartphone. FIGS. 4A and 4B depict scans obtained from a smartphone camera with depth-sensing technology, as may be used on a smartphone or tablet device, and requests for user confirmation of the scan.

Figure 5:
FIG. 5 depicts an exemplary customization interface, according to one embodiment of the disclosure.
Figure 6:
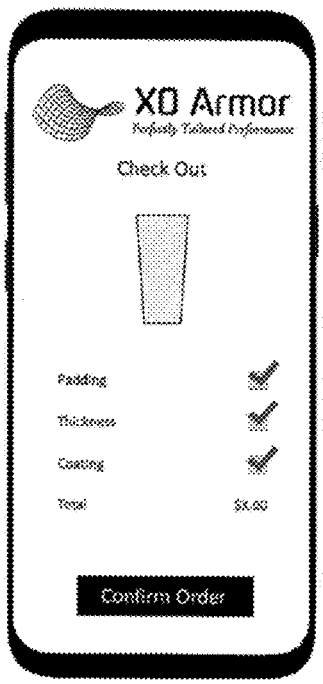
FIG. 6 depicts an exemplary purchase screen and shopping cart, according to one embodiment of the disclosure.

Next the user may view and manipulate the scanned data behind the selected pad shape 106. For example, as shown in FIGS. 4A and 4B, the outline of a shin guard may be superimposed against the scan. The user may have several options for manipulating the pad. For example, the user may locate the pad at a given location. The user may define the size of the desired pad, such as by changing the length of the pad going up or down the shin to be longer or shorter, or changing the width of the pad to be wider or narrower. Alternatively, the rendering of the pad may be fixed, and the scanned data of the body shown behind the rendering may be zoomed in or out until sized to the user's preference. The user may also modify other elements of the pad, such as the thickness of the liner or the shell. The user may also rotate the pad. If available from the manufacturer, the user may also specify any cosmetic details, such as the color or an image printed on the shell. After the user has manipulated the pad to obtain the desired shape and body coverage area, the user may view a model of the completed product 108. This imagery may be produced by applying a mock-up of the product over the scanned data, by use of augmented reality, or other visual techniques. After the user completes the selection and customization of the pad, the user may purchase the pad. An example customization screen is shown in FIG. 5. An example purchase screen and shopping cart are shown in FIG. 6.

Once the user confirms the purchase, the data from the scan and related user customization undergoes software-directed automated characterization 110 to define the product models for manufacture. Automated characterization may first include one or more steps to confirm the usability of the body scan 112. For example, the scan may be reviewed to determine if it is corrupted. It may also be inspected to confirm that scan data is available for the entire body part underneath the shape boundary defined by the user. These inspections may be performed during the course of the user characterization steps to ensure a proper scan image and user-customized pad are provided. For example, if the file is corrupted or the scan data is incomplete, the software may perform the check, determine the scan is not usable, and direct the user to rescan. As another example, if the user widens the pad width so much that it no longer fits within the underlying body scan, the user may be blocked from setting the pad that wide or may be directed to select a different size, and the user may be blocked from proceeding until an appropriate pad size is depicted.

Next, scan data from outside of the pad boundary may be removed 114. This step saves processing time and data storage by removing unnecessary data from the remainder of the data processing steps.

Figure 7:
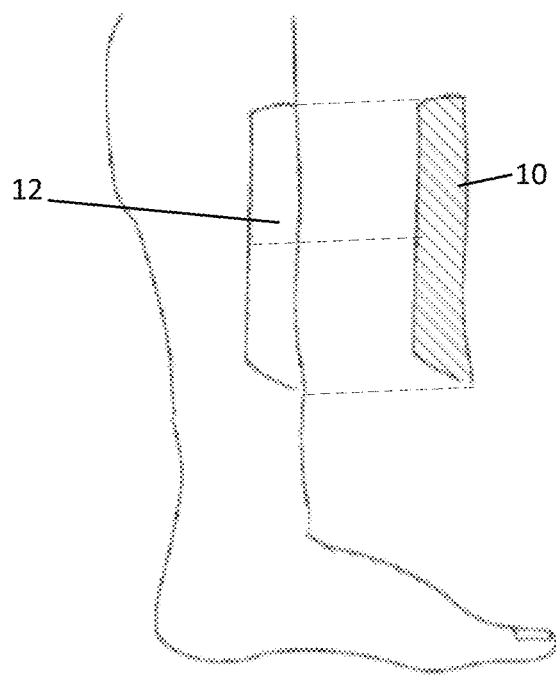
FIG. 7 depicts a mesh model for a shin guard based on a surface area of a wearer's leg, according to one embodiment of the disclosure.

A mesh model is prepared using the remainder of the body scan data 116. A figurative example of a mesh model 10 as based on underlying scan data obtained from a body scan of a location 12 is depicted in FIG. 7. The mesh model 10 provides the underlying data structure from which the pad is designed. A mesh model may be generated using any known mesh modeling techniques (e.g., face-vertex meshes, winged-edge meshes, half-edge meshes, quad-edge meshes, vertex-vertex meshes, etc. Preferably the mesh model 10 has a high resolution (e.g., at least 0.1 mm) to provide a detailed representation of the physiometry of the end-user's scanned body part or region 12.

The mesh preparation process is described herein. To prepare the mesh model, the body surface data is down-sampled to provide uniform vertex spacing across the body surface that is within the pad outline. A center of origin is identified to create quantifiable mesh design along the three spatial axes for proper alignment for manufacturing. Next, the surface data is smoothed to remove noise from the data. Each vertex in the mesh is replaced with new vertices based on the average location of the nearest vertex neighbors. After this, the smoothed surface data is transformed into a mesh. Different meshing techniques may be used. For purposes of example, this disclosure uses a triangulated mesh, wherein the vertices are connected into triangular surface elements forming the surface mesh. After triangulation, the normal direction of each vertex forming the mesh is checked and aligned. This is crucial for shapes with complex curvature, as a mismatched vertex normal will cause other surfaces of the three-dimensional model to shift in different directions and create invalid geometries for manufacturing purposes.

Figure 8:
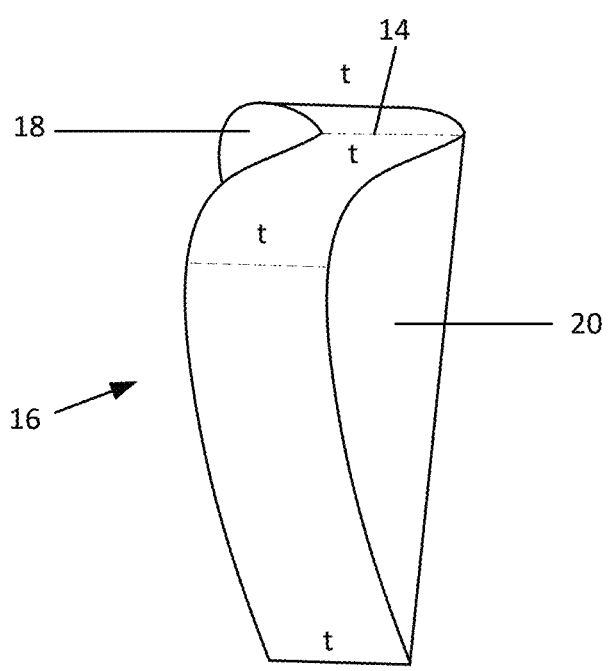
FIG. 8 depicts a thickened mesh for preparing a shell of thickness t, according to an embodiment of the disclosure.

The next step is preparing the pad model based off of the body scan mesh 120. The pad is derived from the user's physiometric parameters as defined in the mesh. For this portion of the process, the first step 122 is applying a thickness offset 14 to the three-dimensional mesh surface 10. The thickness offset 14 may be pre-set, or it may be identified by the end-user as part of the product customization prior to purchase. The 3D mesh prepared by the user and software is given a thickness t of the desired amount. For example, for a shin guard, the thickness may be about 3 mm. The user may also select a different thickness, e.g., 2 mm, 4 mm, or 5 mm. The mesh is then offset in the desired orientation. In most instances the mesh is laterally translated the offset distance in a desired direction, e.g., for shin guards, the offset is directly outward from the "forward" orientation of the leg. An example of a thickened mesh model 16 having a translational offset 14 such as for a shin guard is shown in FIG. 8. The thickness t in FIG. 8 is overly large to figuratively depict a first surface 18 (shown here as the surface that would face the wearer's leg) and a second surface 20 (shown here as the surface facing away from the wearer's leg). The first surface 18 and the second surface 20 are substantially identical.

For other pads, the offset direction may be different. For example, shoulder pads may be offset orthogonally from the differential location of the shoulder (such that the pad appears to expand radially around the shoulder) rather than translationally. The result of the offset is a product design having two new, user-defined surfaces. The first surface is the interior surface of the foam liner for creating a fit between the inner surface of the 3D model and the body of the user. The second surface is the exterior surface of the pad. The model is then checked again for any intersection between the two surfaces. Intersection is typically caused by excessive down sampling and vertex normal mismatching. This problem is addressed by creating finer meshes and restarting the three-dimensional model generation process. The program will keep refining the mesh until two surfaces are created without intersection.

After the offset, the mesh surface should still be identical to the surface of the mesh as originally prepared from the body scan data, although depending on the direction of the offset, it may be proportionally larger or smaller (e.g., if the offset is direction oriented orthogonally or radially, rather than laterally). The surface should also be identical on both the interior surface (that surface facing and typically adjacent to the skin of the wearer) and the exterior surface. However, depending on how the offset is applied and oriented, particular areas of the thickened mesh may suffer from one or more production defects. For example, such production defects may include one or more of overlapping surfaces, locations where a sharp point or edge appears, unexpected holes or curves, or violations of maximum or minimum thickness. In such cases, if the mesh design is repairable, the software may modify the pad to meet applicable design specifications 124, e.g., smooth over areas where a hole appears, or limit the thickened mesh to designated maximum or minimum thicknesses. If the mesh design in not repairable, the production may be cancelled and the end user may be notified.

Edge vertices are identified for both offset surface meshes. This process is performed by identifying edges that belong to only one face for each respective surface, and then storing vertex data from those edges. After vertex data is gathered, one edge vertex is chosen at random to index the order of points around the edge loop in the order that they appear based on the minimum distance between edge points. With edge vertices ordered, the edge data is linearly interpolated to increase edge point data. After edge data is increased, the edge vertices can be spline fit to varying degrees based on user preference. This further refines the edges of the offset surfaces to reduce sharp and otherwise jagged edges. After spline fit edges are created, previous edge data is removed from the mesh and replaced with the new spline fit vertex data. The two spline fit edges are meshed in a similar fashion as the two surface meshes to create a triangulation between the edges of the two surfaces. Point normals for the boundary mesh are calculated and aligned, and then combined with the two offset surface meshes.

This completes the generation of the three-dimensional product model.

Once the offset mesh is prepared, the gear design is identified by an individual serial number and saved within the memory or hard disk storage of the system 126. This is the completed design file. The completed design file is exported to the manufacturing system processors 128.

Manufacturing proceeds in parallel steps for both the liner and the shell. Turning first to manufacture of the liner 130, the mesh surface provided in the completed design file is flattened to provide a liner design 132. (Alternatively, this flattening may occur prior to export to the manufacturing processors.) The flattening technique uses an isomapping process which mathematically flattens the inner surface mesh by maintaining the distance between vertices and face area as closely as possible over many iterations. The edge data of this flattened surface is extracted and exported as a vector file for use in manufacturing to create the outline of padding which will fit perfectly to the 3D model. This liner design is then serialized and saved to the system 134 and exported to a foam liner cutting machine for cutting out the liner 136. The cutting machine cuts out the liner. 138.

Meanwhile the completed design file is prepared for printing in additive printing machine 140. The design may be oriented for manufacture in a manner that reduces the need for fillers or vertical supports and reduces printing time 142. For example, a shin guard may be oriented such that the length of the pad is additively printed vertically, with each layer building upon the one below it. This reduces the need for vertical support to covering just a thin bottom layer. Such an orientation may also provide increased material impact strength. An example of this orientation of a shin guard is shown in FIG. 5. Once oriented for design, the design for the shell of the pad is provided to the printer for manufacture by additive printing 144.

Once the liner has been cut and shell printed, the liner is attached to the shell 150. The attachment may be achieved by adhesive applied to the liner and shell for a permanent bond. This may be done in a vacuum chamber to provide for complete adhesion across both surfaces. This completes production of the pad. The pad may then be shipped to the user 160.

A system for implementing the processes described above are also disclosed herein. In at least some respects, the system includes a body scanning or imaging device operable to take a depth-sensitive image of user. The body scanning device may be a smartphone or tablet with depth-sensing cameras or technology. Such a scanning device may be provided with an application that guides the user to take the necessary images and also received input from the user regarding sizing, shape, orientation on the body, thickness, and other desired attributes of the final product. The image, related product information, and completed design file may be stored on the body scanning device or communicated to a server for storage. The software application on the smartphone or mobile device may also perform the automated characterization 110 steps described above. Alternatively, the automated characterization steps may be performed at a remote server. The server, smartphone, tablet, or other processor may then send instructions for the completed design file to the processors for fabrication machines, such as the liner cutter and/or the additive printing machines.

The processes and systems disclosed herein have been particularly described for designing and manufacturing a single-pad product (in particular with reference to a shin guard). However, multiple pads provided in a single integrated garment, such as a set of shoulder pads, may also be provided. In such cases, multiple body scan images (e.g., of both shoulders, the chest, the upper back, etc.) may be required. Furthermore, in the end user characterization steps the application can receive end user decisions for each of the multiple pads being designed and manufactured.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

We claim:

1. A method for fabricating equipment having a shell and a liner and to be worn by a wearer, the method comprising:
   a) obtaining a body scan of at least a portion of the wearer's body where the equipment is to be worn;
   b) receiving input regarding the equipment, the input comprising a size and location of equipment to be worn on wearer;
   c) preparing a wearer mesh model derived from the body scan at the location of equipment to be worn on wearer;
   d) applying a translational thickness offset to the wearer mesh model to prepare a mesh model of the shell, the mesh model of the shell having a first surface defined by the wearer mesh model and a second surface translationally offset from and identical to the first surface;
   e) checking the mesh model of the shell to identify production defects and, if a production defect is present, removing the defect;
   f) preparing a mesh model of the liner by flattening the mesh model of the shell;
   g) additively manufacturing the shell based on the mesh model of the shell;
   h) manufacturing the liner based on the mesh model of the liner; and
   i) attaching the liner to the shell by adhesively attaching the liner to the shell in a vacuum environment.

2. The method of claim 1, wherein the input further comprises at least one of a group consisting of shell thickness and liner thickness.

3. The method of claim 1 wherein the input is received by displaying to the wearer the body scan and a rendering of the equipment superimposed over the body scan and receiving from the wearer instructions from positioning the body scan behind the equipment at a desired location and of a desired size.

4. The method of claim 3 wherein the wearer mesh model is limited to a body surface of the wearer under which the equipment is superimposed.

5. The method of claim 1 wherein the production defect consists of at least one of the following: an overlapped first surface and second surface, a sharp point on a surface, an edge on a surface, a hole in a surface, a thickness less than a minimum allowable thickness, and a thickness greater than a maximum allowable thickness.

6. The method of claim 1 further comprising linking the mesh model of the shell and the mesh model of the liner to a serial number.

7. The method of claim 1 further comprising orienting the mesh model of the shell along a principal axis of the mesh model of the shell for additive printing.

8. The method of claim 1 wherein the body scan is obtained using LiDAR.

9. The method of claim 1 wherein the body scan is obtained using depth-sensing camera technology.

10. The method of claim 1 wherein the wearer mesh model has a resolution of at least 0.1 mm.

11. The method of claim 1, wherein the equipment is a shin guard.

12. The method of claim 1, wherein the equipment is selected from a group consisting of a shin guard, knee pad, elbow pad, chest protector, shoulder pad, shoulder brace, rib protector, thigh pad, and hip pad.

\* \* \* \* \*